May 27, 1924.

B. G. KLUGH

ELECTRODE AND METHOD OF JOINTING SAME

Original Filed Nov. 8, 1920

1,495,749

INVENTOR
Bethune G. Klugh.
BY
ATTORNEY.

Patented May 27, 1924.

1,495,749

UNITED STATES PATENT OFFICE.

BETHUNE G. KLUGH, OF CHICAGO, ILLINOIS, ASSIGNOR TO FEDERAL PHOSPHORUS COMPANY, OF BIRMINGHAM, ALABAMA, A CORPORATION OF ALABAMA.

ELECTRODE AND METHOD OF JOINTING SAME.

Application filed November 8, 1920, Serial No. 421,944. Renewed November 9, 1922. Serial No. 599,935.

*To all whom it may concern:*

Be it known that I, BETHUNE G. KLUGH, a citizen of the United States of America, residing at Chicago, in the county of Cook and State of Illinois, have invented certain new and useful Improvements in Electrodes and Methods of Jointing Same, of which the following is a specification.

This invention relates to an improved method of joining the sections of electrodes as placed in service in an electric furnace, and has for its object to improve such joints so as to give greater mechanical strength and electrical conductivity to electrodes at the joints with resulting increased length of service and greater economy in the electrode consumption of electric furnace operation.

This invention is especially valuable in its application to the smelting of phosphates in an enclosed electric furnace of the type described in my pending application, Serial No. 387807, filed June 10th, 1920. This value lies in the fact that it is necessary that about ten feet of electrode be carried below the holder, in order to take advantage of the characteristics of said described furnace in its operation upon the smelting of phosphates. This length of electrode when suspended below the holder in its normal service, places unusual strain upon the joint and thus requires that said joint have as nearly as possible the body strength and conductivity of the electrode. It is obvious that any breaks in the continuity of the electrode at its joint will result in increased resistance to the passage of the electric current therethrough which results in heating, even arcing, and air burning about the joints, often resulting in rupturing the electrode by the accumulative destructive action, and causing the loss of all sections at and below the broken joint. It is further obvious that resulting interruptions in the continuity of furnace operation will be disastrous to the commercial operation of the furnace. The herein-described invention is equally applicable to electrode joints in all electric furnace operations where electrodes are used, whether melting or smelting, continuous or intermittent.

The electrode which in the present state of the art is practically standard for the service of continuous "feed" or "slip" electrodes, consists of round sections made in lengths of 5 feet and upward, each having female threads in each end in a central screw seat. The screw seats are concentric with the aligning longitudinal axes of the electrodes and as the ends of the electrodes are planed off to a smooth face at right angles to their aligning longitudinal axes, a connecting pin of substantially the same material as the electrode is provided for joining the sections together by screwing same into the screw seats of each two contiguous electrodes, and thus bringing them together face to face like a continuous piece, which is fed downward through a "slip-holder" by means of which the electric current is delivered to the electrode for passage into the furnace for its transformation into heat energy.

The means heretofore employed of making up the joints as hereinbefore described, consist in either depending upon the contact made by the faced ends of the electrodes when screwed together by the connecting pin, or of coating the threads and faced ends with a "paste" made up of wholly or partly graphitized carbon, with some aqueous binder consisting either of water alone or of a solution of molasses or other syrup of like nature.

It is, however, well known to those experienced in the use of electrodes in electric furnace practice, that with the various sizes of the materials entering carbon electrodes, it is practicably impossible to always machine threads and faces involved in the joining of electrodes that will give such an accurate and continuous contact throughout the joint as will even approximate in mechanical strength and electrical conductivity a joint obtained by the use of some joint compound. Furthermore, the section of the electrode that is in the furnace is essentially at a high temperature from conducted heat and when a paste of conductive carbon with any aqueous syrup solution binder is applied to the upper end of such electrode while in service, the said binder material hardens and becomes immobile immediately thus defeating the object of the paste as a medium for spreading over the surface and completely filling all voids in the joint.

There appears further in the smelting of phosphatic materials in the electric furnace to be some reaction of the gaseous and liquid materials in the charge upon any joint compound of a binder of aqueous sugar solutions to the extent of the joint being attacked on all of its contact surface, resulting in broken electrical contact and resultant heating from resistance with often ruptures said electrode at said joint.

My invention has for its object to produce an electrode joint superior to any heretofore attained and it is based upon the following steps, to-wit:—

1st: I select a paste of such character as to be softened by the heat at the joint, when made with an electrode in service, and which will not therefore harden before it can flow into and completely fill all voids in the joint. Preferably the paste is composed of comminuted electrically conductive carbon and a bituminous binder thinly liquid in temperatures from 175° to 200° C.

2nd: I avoid any tendency of paste or generated gases being trapped in the inner end of the screw sockets and preventing the positive surface contact between the electrode ends, by the provision of vents leading from the inner ends of the screw seats and adapted to both vent the air or generated gases and to permit any excess paste in the screw joint to extrude. This feature is of great importance in that it avoids air pockets, prevents any tendency of trapped paste in the seat to hold the electrode ends out of contact, and enables a thick paste to be employed with the assurance that it will fill all voids in joint.

3rd: I bake the joint before it assumes load bearing and current conducting functions.

In the accompanying drawings I illustrate the preferred manner of practicing my invention;

Fig. 1 being a cross sectional view through an enclosed electric furnace showing the electrode in vertical cross section with its joint in the process of being baked.

Similar reference numerals refer to similar parts throughout the drawings.

Figure 1:
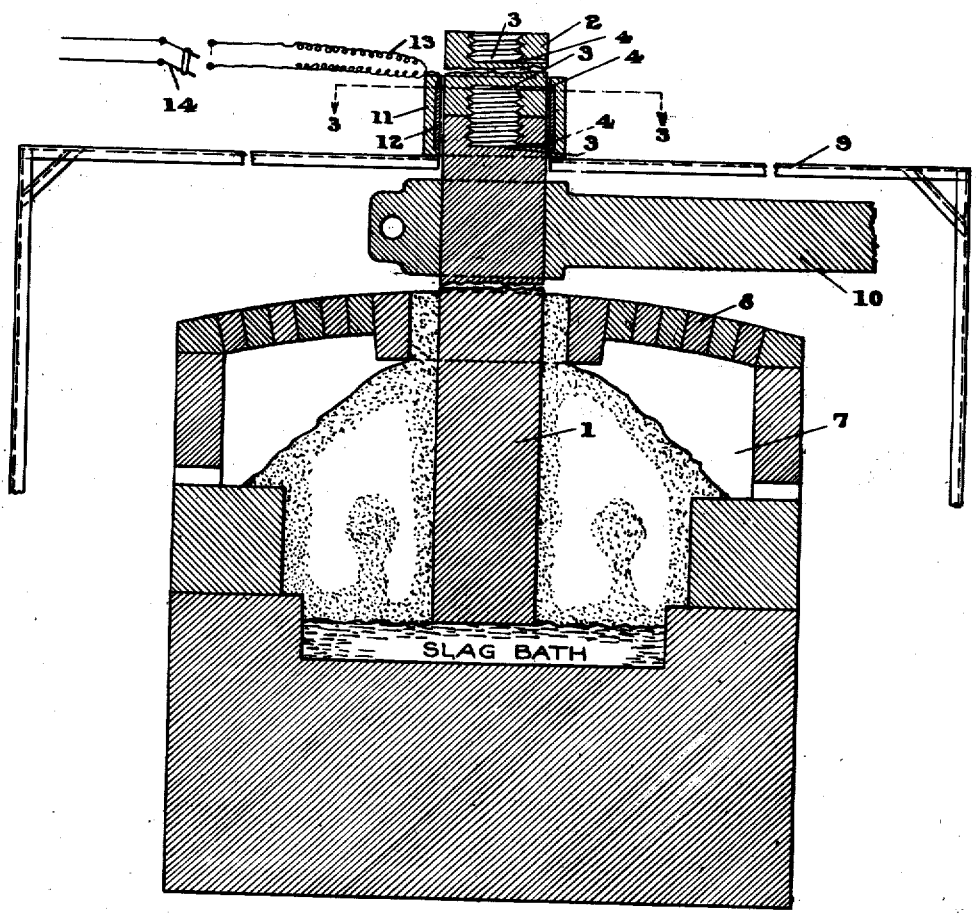
Figure 2:
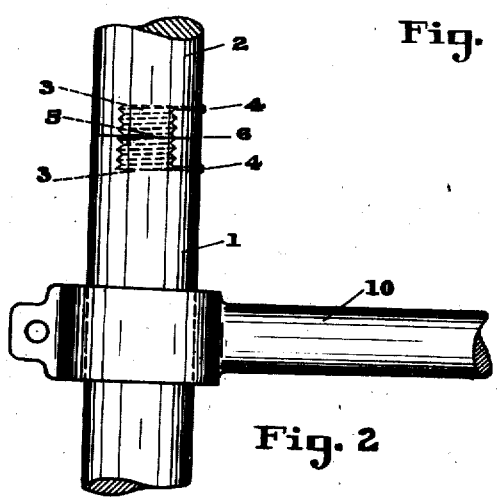
Fig. 2 is an elevation of the baked joint between electrode sections.

I will first describe the manner of compounding and applying the paste which I prefer to use in making the electrode joints. I first make up a paste consisting of either amorphous graphite or carbon largely graphitized, and ground so that about fifty per cent by weight thereof will pass a 200 mesh sieve and all will pass a 100 mesh sieve. I then mix with said carbon about twenty per cent of its weight of a mixture of tar and pitch practically free from naphthalene. The said mixture of tar and pitch should be in ratio of about one-third tar to two-thirds pitch, and the tar must have been previously dehydrated, which dehydration can be performed by heating two hours at 150° centigrade.

The tar and pitch mixture above described is heated to a freely liquid state and the aforesaid carbon thoroughly and intimately mixed, said mixing being conducted with the whole mass heated to between 175° and 200° C.

The paste above described works very successfully in the hereinafter described procedure, but I have further found that the joint made therewith is further improved by the addition of finely divided metal, preferably clean cast iron borings of not over 20 mesh size in proportion to about 15 per cent of the weight of the carbon, to the mixture and mixing all the constituents together at the temperature of 175° to 200° C.

This paste is applied to the electrode ends while hot, the temperature of such ends being maintained between 200° and 300° C. so that the paste above described will retain its plastic condition when applied and will remain so until the two sections of the electrodes to be joined are screwed together on the threaded pin to the full tension and face contact desired for the joint.

I have found that when the above described procedure is carried out joints are made that have almost the electrical conductivity of the body of the electrode sections, and no attacking of the joints in the smelting of phosphatic materials is evident. This has been proven by long comparative tests in the same furnace and under similar conditions with the result that the troubles with defective joints made up in accordance with my present method were practically nil as against almost continuous trouble from joints made up with pastes of carbon and aqueous solution binders as in the standard practice heretofore prevailing in the art.

While I have described the mixture and method used in very specific detail as to exact proportions and temperatures, which I have found to give the best results, it is obvious that the purpose of my invention is to produce a paste that will soften when heated and therefore can be spread freely so as to fill all voids in the joint and that will be of such character that when baked it will provide and maintain electrical conductivity and mechanical strength such as will approximate conditions obtaining in the body of the electrode section. It is therefore further obvious that with varying characteristics of available constituents for such a paste, those skilled in the art may depart somewhat from the details I have described and still remain within the spirit of my present invention, I, therefore, do not wish to be confined to the exact proportions and details herein described.

I have found that certain details of procedure render the use of joint paste more effective and constitute a further improvement upon the present state of the art of electrical smelting to which it is applicable.

When the paste for electrode joints is composed in part of bituminous material a portion thereof will be gasified in the carbonization thereof as its temperature rises in service, and there will be considerable pressure developed within the tightly fitted joints of the electrode sections with each other and the connecting screw pin. The same conditions will obtain where the paste is an aqueous solution as the water will vaporize at the temperatures and develop pressure and voids in the joint. Moreover, without regard to the character of the paste used, if it be attempted to fill all voids in the screw joints the screw seats must have an excess of paste to fill the screw joint voids before the screw pin is inserted and yet no excess must remain therein after the pin is screwed in which would prevent the end faces of the electrodes being brought to proper contact without developing torsion on the screw pin which might injure or fracture the latter. Having these conditions in mind, I provide the electrode sections 1 and 2 with threaded screw seats 3, which seats are disposed concentrically in the electrode ends and at the inner end of each seat I provide a lateral vent hole 4 which opens through the side of its respective electrode and is sufficient in diameter to form a vent opening for the escape of air and steam or gases generated in the joint and an extrusion opening through which any excess paste trapped at the inner end of the screw seat may exude. A screw pin 5 is adapted to screw into the two seats 3 of sections to be joined and is of such length as to engage the ends of the seats at the same time that the abutting end faces 6 of the joint come into full and complete surface contact. The screw pin is composed of conductive material like the electrode. The vents in practice are about five-eighths of an inch in diameter and are drilled inwardly at right angles through the sides of the electrodes. In practice the paste is first applied to the ends and screw seats of both electrodes and the pin is then screwed into one electrode seat, after which the other electrode is hoisted into position to engage the screw pin in its respective screw seat and turned to screw the electrode sections together on the pin. Where my preferred paste is used both electrode ends are brought to the desired temperature to maintain the fluidity of the paste during the making of the joint, but where other pastes are used the joint should be made with the electrode ends at such temperature as to avoid the quick hardening of the paste and permit the latter to remain sufficiently fluid to flow into and fill the joint voids and exude through the vents 4 as the joint is screwed tight. Obviously by this arrangement no abnormal torsion strain is placed upon the screw pin and the joint as a whole has all voids perfectly filled with paste.

The method of and means for baking the paste joint for electrodes is illustrated in Fig. 1. Here I show an enclosed electric furnace 7 having an arch 8 with a top opening through which the sectional electrode enters the furnace. I provide a platform 9 raised sufficiently above the electrode holder 10 to allow the required travel of the electrode in the regulation thereof. This platform is insulated or constructed of insulating material such as concrete so that no electrical contact is possible with the electrode which projects upwardly therethrough. The workmen in making the joints work on this platform and as the electrodes are consumed in the furnace new sections are added by being joined onto the electrode in service and thus interruption of furnace operation is avoided. To obtain best results it is necessary to completely bake the paste joint before permitting it to support the burden of the electrode in the furnace or conduct the current thereto. By baking I mean the heating of the paste joint to a point where it reaches a chemical stability substantially equal to that of the body of the electrode sections joined.

Figure 3:
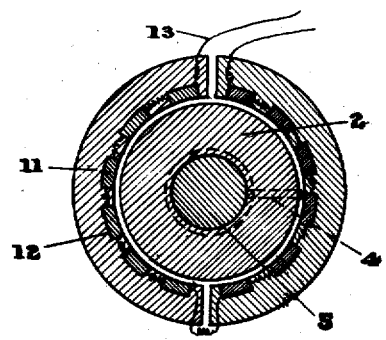
Fig. 3 is a horizontal cross sectional view taken on the line 3—3 of Fig. 1.

I illustrate this baking procedure in Fig. 1. After the top section of the electrode 2 is joined to the bottom section 1, by the aforedescribed procedure, I take a heating jacket 11 which is made up of split sections, as shown in cross section in Fig. 3, and surround the electrode with such sectional jacket so that as the joint of said continuous made-up electrode is passed slowly down through said jacket, the baking of the joint compound is completed before it reaches holder 10 to become conductor of electric current into said furnace as well as a support for the portion of the electrode below it. This jacket 11 is composed preferably in construction of electrical resistance heat elements 12, to which electric current is supplied by means of a flexible electric cable 13, thus providing for its removal while making up the joint as aforedescribed. A switch 14 can be used to cut off current after the joint has been baked.

This heating jacket may be made up of any other suitable heating device such as a gas burner, or even of a solid fuel burner of annular sectional design may be adapted to this service, and it should be understood that I claim broadly the feature of baking an electrode joint prior to its being placed in the electrical circuit and assuming the burden of sustaining the suspended electrode below. I thus attain in effect a continuous electrode of substantially uniform strength and conductivity which is made up of sections which are completely bonded together before assuming any active function in the furnace.

Having thus described my invention, what I claim as new and desire to secure by Letters Patent, is:—

1. A method of joining electrodes consisting in coating contacting surfaces thereof with thermally softened carbonaceous paste.

2. A method of joining sections of electrodes consisting of coating contacting surfaces thereof with a paste, said paste being composed of a mixture of comminuted electrically conductive carbon, and a binder of thermally liquefied bituminous material.

3. A method of joining sections of electrodes consisting of coating contacting surfaces thereof with a paste composed of comminuted electrically conductive carbon, a comminuted metal, and a binder of thermally liquefied bituminous material.

4. A method of joining sections of electrodes consisting of coating contacting surfaces thereof with a paste softened for the application by heat and composed of comminuted graphitized carbon mixed with pitch and dehydrated tar, said tar-pitch mixture being of such character as to be thinly liquid at 175 to 200 degrees centigrade.

5. A method of joining sections of electrodes consisting of coating contacting surfaces thereof with a paste softened for the application by heat, said paste being composed of comminuted graphitized carbon and finely divided cast iron borings mixed with pitch and dehydrated tar, said tar-pitch mixture being of such character as to be thinly liquid at 175 to 200 degrees centigrade.

6. A method of joining sections of electrodes consisting in coating contacting surfaces thereof with thermally softened carbonaceous paste, said electrode sections being heated to a temperature between 200 degrees and 300 degrees centigrade prior to application.

7. A method of joining sections of electrodes consisting of coating contacting surfaces thereof with a paste composed of a mixture of comminuted electrically conductive carbon, and a binder of thermally liquefied bituminous material, said electrode sections being heated to a temperature between 200 degrees and 300 degrees centigrade prior to the application of said paste.

8. A method of joining sections of electrodes consisting of coating contacting surfaces thereof with a paste composed of comminuted electrically conductive carbon, a comminuted metal, and a binder of thermally liquefied bituminous material, said electrode sections being heated to a temperature between 200 degrees and 300 degrees centigrade prior to the application of said paste.

9. A method of joining an electrode section to an electrode in service to form a continuous electrode, which consists in coating the contacting surfaces with a paste which will not immediately harden when subjected to the service electrode's temperature, and baking said paste in the joint before the latter assumes its load supporting and current carrying functions in the furnace.

10. The method of making continuous electrodes, which consists in connecting an electrode section to the electrode in service by a joint having its voids filled with paste which is baked before the joint is interposed in the path of the electric current.

11. A method of joining sections of electrodes consisting in coating contacting surfaces thereof with thermally softened carbonaceous paste, and baking said electrode joint prior to placing same in the electric circuit.

12. A method of joining sections of electrodes consisting of first heating and then coating the contacting surfaces thereof with a paste composed of a mixture of comminuted electrically conductive carbon, and a binder of thermally liquefied bituminous material and baking said electrode joint at a temperature sufficient to carbonize said paste in said joint contacts prior to placing it in the electric circuit supplying electric current to the furnace in which said electrode is in service.

13. A method of joining electrode sections having screw seats and a screw connecting pin, which consists in coating the joint with paste, and venting the seats to permit the escape of air, generated gases and excess paste as the sections are screwed together on the pin.

14. A method of joining electrode sections having screw seats and a screw connecting pin, which consists in heating the electrode ends to a predetermined temperature, coating the ends and seat with a paste which will remain soft at the temperature of the electrode ends, and venting the seats to permit the escape of air, generated gases and excess paste as the sections are screwed together on the pin.

15. The hereindescribed process of making up electrode joints consisting in providing extrusion and vent openings communicating from the base of the screw seats of said electrode sections, coating all contact surfaces of electrode sections with an excess of paste composed of a mixture of comminuted electrically conductive carbon and a thermally liquefied bituminous binder, joining said sections of electrode by means of screw connecting pin, and assuring complete filling of all voids about contact surfaces by causing the excess of said paste coating said screw contact surfaces to be extruded through said provided vent openings.

16. The hereindescribed process of making up electrode joints consisting in providing extrusion and vent openings communicating from the base of the screw seats of said electrode sections, coating all contact surfaces of electrode sections with an excess of comminuted graphitized carbon mixed with pitch and dehydrated tar, said tar-pitch mixture being in such proportion as to be thinly liquid at 175 to 200 degrees centigrade, joining said sections of electrode by means of screw connecting pin, and assuring complete filling of all voids about the screw contact surfaces by causing the excess of said paste coating said contact surfaces to be extruded through said provided vent openings.

17. The hereindescribed process of making up electrode joints consisting in providing extrusion and vent openings communicating from the base of the screw seats of said electrode sections, coating all contact surfaces of electrode sections with an excess of paste composed of a mixture of comminuted electrically conductive carbon and a thermally liquefied bituminous binder, and joining said sections of electrode by means of screw connecting pin, assuring complete filling of all voids about contact surfaces by causing the excess of said paste coating said screw surfaces to be extruded through said provided vent openings.

18. The hereindescribed process of making electrode joints consisting in providing extrusion and vent openings communicating from the base of the screw seats of said electrode sections, coating all contact surfaces of electrode sections with an excess of paste composed of comminuted electrically conductive carbon, a comminuted metal and a binder of thermally liquefied bituminous material and joining said sections of electrode by means of screw connecting pin, assuring complete filling of all voids about contact surfaces by causing the excess of said paste coating said screw contact surfaces to be extruded through said provided vent openings, baking said electrode joint by extraneously applied heat prior to the passing of said joint of said resulting continuous electrode into the electric circuit supplying the electric furnace in which it is used with electric current, said baking being performed at a temperature sufficient to completely carbonize the said joint paste, substantially as described.

19. An electrode having in its end a screw socket with a vent at the inner end thereof.

20. An electrode having at its end a screw socket with an opening adapted to permit the joint paste to extrude therethrough.

In testimony whereof I affix my signature.

BETHUNE G. KLUGH.

Witness:
Nomie Welsh.